United States Patent [19]

Beach et al.

[11] 4,343,653

[45] Aug. 10, 1982

[54] COMPLETELY OXIDIZED SULFUR BLACK 1 FOR INK

[75] Inventors: Bradley L. Beach, Lexington, Ky.; Paul D. Gates, San Francisco, Calif.; Vaughn J. Schum, Jr., Lexington, Ky.

[73] Assignee: International Business Machines Corporation, Armonk, N.Y.

[21] Appl. No.: 255,075

[22] Filed: Apr. 17, 1981

[51] Int. Cl.³ .............................................. C09D 11/02
[52] U.S. Cl. ........................................ 106/22; 106/20; 260/137
[58] Field of Search ........................... 106/22; 260/137

[56] References Cited

U.S. PATENT DOCUMENTS 4,229,219  10/1980  Metz ...................................... 106/22
4,229,747  10/1980  Hwang ................................... 106/22
4,269,627   5/1981  Hwang ................................... 106/22
4,299,630  11/1981  Hwang ................................... 106/20

FOREIGN PATENT DOCUMENTS 2818573  11/1978  Fed. Rep. of Germany .

OTHER PUBLICATIONS

Venkataraman, The Chemistry of Synthetic Dyes, vol. II, 1952, pp. 1080–1098.

*Primary Examiner*—John Kight, III
*Assistant Examiner*—R. A. White
*Attorney, Agent, or Firm*—John A. Brady

[57] ABSTRACT

Particle occurrence in an aqueous jet ink from Sulfur Black 1 is greatly reduced by employing a Sulfur Black 1 completely oxidized at the solubilizing groups.

8 Claims, No Drawings

COMPLETELY OXIDIZED SULFUR BLACK 1 FOR INK

DESCRIPTION

1. Technical Field

This invention relates to aqueous inks for printing through a nozzle. Such inks may be jet inks, which are propelled as drops across a space to a paper or other substrate.

This invention is directed to the minimization of particles in aqueous inks. Solids cause clogging at the nozzle and on internal filters. Accordingly, this invention is useful in any system in which ink passes through a nozzle or the like subject to obstruction by particles in the ink.

2. Background Art

The essence of this invention is in the use of Sulfur Black 1 (SB 1) with solubilizing groups completely oxidized in an aqueous ink. The use of ordinary Sulfur Black 1 is entirely within the state of the art prior to this invention. Typically, Sulfur Black 1 has been used as one of a mixture of dyes, since it is most absorptive in the near infrared range of 800 to 900 nm. To provide a greater response in the visible range a second dye absorptive in the visible range is added. Sulfur Black 1 may be employed alone in a dye formulation, as shown in Federal Republic of Germany Patent Disclosure Paper No. 28 18 573 disclosed Nov. 2, 1978. However, this invention recognizes that because of hydrolysis of the thiosulfonate salt group on the solubilized Sulfur Black 1, the dye will slowly precipitate from the ink.

Although the related chemistry of dye solubility is generally understood, no specific teaching with regard to the solubility of Sulfur Black 1 or a substantially similar dye molecule is known. The use of a Sulfur Black 1 completely oxidized at the solubilizing groups is believed to be fundamentally novel over the state of the prior art.

DISCLOSURE OF THE INVENTION

In accordance with this invention, the discovery is made and employed that thorough oxidation of the solubilizing groups of Sulfur Black 1 results in a non-precipitating dye in aqueous solution while the dye retains its important characteristics of near infrared response, blackness to visual observation, and compatibility with typical ingredients in aqueous inks. The Sulfur Black 1 may be treated with hydrogen peroxide as a presscake or while a component of an aqueous mixture. Even a multi-ingredient jet ink containing Sulfur Black 1 as a dye may be treated with oxidizing agent in accordance with this invention.

BEST MODE FOR CARRYING OUT THE INVENTION

The empirical formula of Sulfur Black 1 is disclosed in the *Color Index*, along with the manufacturing process. The final structure is unknown, and probably somewhat variable. A dominant starting material is a benzene ring substituted by two nitro groups and one hydroxyl group, and the final formula is said to be $C_{24}H_{16}N_6O_8S_7$ or $C_{24}H_{16}N_6O_8S_8$, depending on the process of manufacture.

In accordance with this invention hydrolytically stable Sulfur Black 1 may be produced from the presscake. The presscake is the dried, final product of synthesis from starting materials and is known to contain most of the Sulfur Black 1 in water-insoluble form and the remainder of the Sulfur Black 1 in water-soluble form.

EXAMPLE 1

From Presscake

Hydrogen peroxide ($H_2O_2$) in the amount of 1% by weight is added to a mixture of 5% by weight Sulfur Black 1 in water. This mixture is stirred for 2 hours.

An insoluble residue in the order of magnitude of 1% by weight of the starting presscake remains and is filtered out. The remaining Sulfur Black 1 became fully dissolved.

EXAMPLE 2

From Solubilized SB 1

Water soluble Sulfur Black 1 is obtained commercially and is dissolved in distilled water. Hydrogen peroxide in the amount of 5% by weight is added to such a solution of the solubilized Sulfur Black 1 having 5% by weight of the dye. This mixture is stirred for 2 hours. No residue forms.

Effect of pH—Table 1 below demonstrates that the reaction of solubilized Sulfur Black 1 with hydrogen peroxide varies with pH. Table II shows the results of an otherwise identical control with no hydrogen peroxide added. Reactions as above were carried out at the pH level shown and the ratio of absorbance of the modified dye at 620 nm to 800 nm was measured. The ratio is a measure of the amount of reduction of near infrared absorbance (i.e., at 800 nm). Lower values of this ratio indicate little or no reduction. As shown in Table II a ratio of 1.3 indicates little or no reduction.

It was surprisingly found that reaction at high pH favors reduction in near infrared absorbance, while low pH favors very little change. Accompanying the loss of near infrared absorbance is a color change from bluish black to greenish black. Samples at pH 8 and above have ratios above 2.0 and exhibited varying degrees of color change.

No such change is observed at low pH. Since the Sulfur Black 1 is typically added to the ink as a near infrared absorber, modification should generally be conducted at low pH, preferably at a pH of about 4.

TABLE I

| 5% solubilized SB 1 with 5% $H_2O_2$ | |
|---|---|
| pH | Absorbance Ratio 620 nm/800 nm |
| 2 | 1.8 |
| 3 | 1.9 |
| 4 | 1.7 |
| 6 | 1.9 |
| 8 | 2.3 |
| 9 | 2.6 |
| 10 | 2.1 |
| 11 | 2.2 |
| 12 | 2.3 |

TABLE II

| 5% solubilized SB 1 (unmodified) | |
|---|---|
| pH | Absorbance Ratio 600 nm/800 nm |
| 2 | 1.3 |
| 3 | 1.3 |
| 4 | 1.3 |
| 6 | 1.3 |
| 8 | 1.3 |
| 9 | 1.5 |

TABLE II-continued

| 5% solubilized SB 1 (unmodified) | |
|---|---|
| pH | Absorbance Ratio 600 nm/800 nm |
| 10 | 1.3 |
| 11 | 1.3 |
| 12 | 1.3 |

Degradation of optical characteristics was not noted where pH buffers were not employed. This was true because in a straightforward combination of Sulfur Black 1 and hydrogen peroxide. The pH drops rapidly. Initially in mixing 5% SB 1 and 5% hydrogen peroxide, the pH was about 11, but it dropped rapidly to about 2. Very little degradation of the product is near infrared absorbance resulted, the ratio measured being 1.7. The dried product also could be redissolved in base.

Amount of $H_2O_2$—where the modification is carried out with insufficient oxidizing agent, the dye becomes insoluble when evaporated to dryness in acidic solution. Reactions as above were carried out with different loadings of hydrogen peroxide. This is detailed in Table III below, which indicates that the reaction does not go to completion with less than 3% by weight hydrogen peroxide. Also, no significant degradation of near infrared absorbance is indicated at reaction at higher levels of hydrogen peroxide, even up to 10% hydrogen peroxide.

Identical results as in Table III were realized when the dry samples were first heated in 6 M hydrochloric acid (HCl) after which the sample was recovered and it was attempted to redissolve the same in base. Sulfur Black 1 at 5% treated with 1% and 2% hydrogen peroxide would not redissolve. Identical samples treated at 3% to 10% hydrogen peroxide did redissolve, indicating that a hydrolytically stable form was produced.

TABLE III

| % $H_2O_2$ in 5% Solubilized SB 1 | Dye Re-Dissolves After Dryness in Acid | Visible Color Change |
|---|---|---|
| 1 | No | No |
| 2 | No | No |
| 3 | Yes | No |
| 4 | Yes | No |
| 5 | Yes | No |
| 10 | Yes | No |

EXAMPLE 3

In a Jet Ink

A typical jet ink known prior to this invention is described below:

| Component | Percent by weight (By order of magnitude) |
|---|---|
| Distilled Water | 75 |
| Sodium Omadine | 0.1 |
| Hampene 220 | 0.2 |
| Carbowax 200 | 5.0 |
| N-methyl-2-pyrrolidone | 4.0 |
| 2MB | 6.0 |
| Butyl Cellosolve | 3.0 |
| Sulfur Black 1 | 1.0 |
| Visible Range Dye (e.g., Direct Black 163 or Direct Black 19) | 3.0 |
| Sodium Carbonate | 0.2 |
| Sodium Hydroxide | As required |

Final characteristics (order of magnitude): pH 10; Viscosity 3 centistokes @ 70° F.; and Density 1.05 gr./cm$^3$.

Sodium Omadine is a brand named biocide of Olin Corporation. Chemically, it is 90% sodium 2-pyridinethiol-1-oxide and 10% inert ingredients.

Hampene 220 is a brand named sequestering agent of W. R. Grace and Company. It is used to sequester heavy metals in the ink. Chemically, it is tetrasodium ethylenediaminetetraacetate.

Carbowax 200 is a brand named product of Union Carbide Corporation. It is used to prevent crust formation during shutdown. Chemically, it is polyethylene glycol of 200 average molecules weight.

The 2MB is a water fastness agent and has some anti-crusting activity. It is a 2 hydroxyethyl substituted polyethyleneimine having 7 or more nitrogen atoms per molecule. The material is a product of Cordova Chemical Company.

Butyl Cellusolve is a well known brand named product used as a paper penetrant. Chemically it is ethyleneglycol-monobutyl ether.

Sodium carbonate and sodium bicarbonate function as buffers.

The jet ink is manufactured from high-purity materials and thoroughly filtered, so as to remove particles.

To this jet ink is added 3.5% by weight hydrogen peroxide, with thorough stirring.

The resulting ink shows no degradation of print quality and characteristics, while indicating dramatically lower particle formation after storage for several weeks.

Table IV shows a comparison of the response of the jet ink in the visual range over a two week period, as compared to the ordinary jet ink as a control. The differences in absorbance are minor at most. Although the degradation of response is a concern, it results from a change in the optical-range dye, not the Sulfur Black 1. These results demonstrate that the modified Sulfur Black 1 has no detrimental effect over the unmodified dye in this action.

| | Absorbance/gm @ 600 nm | | |
|---|---|---|---|
| Ink | Immediately (Room Temp.) | 1 wk. @ 60° C. | 2 wk. @ 60° C. |
| Standard Ink as Control | 13.5 | 11.3 | 8.80 |
| Standard Ink with Modified SB 1 | 14.0 | 11.1 | 8.40 |

Analysis of Product of Oxidation

Infrared spectroscopy on the results of presscake oxidation of Example 1 and the solubilized SB 1 oxidation of Example 2 show sulfur in substituents is virtually entirely in the form of the sulfonate radical (R-SO$_3^-$). Nothing appeared indicating a change in the basic, complex main molecules at the dye.

As a second test, the products of Examples 1 and 2 were heated over several hours in a acidic solution. No insoluble residue developed, while with ordinary Sulfur Black 1 a significant insoluble product would have been inevitable.

Theory of the Oxidation Chemistry

The chemistry of Sulfur Black 1 is not fully understood, and any given quantity of the dye probably is a mixture varying in minor respects from other Sulfur Black 1. Accordingly, this discussion of theory is necessarily somewhat speculative and should not be viewed as a limitation on the invention as herein described with reference to empirical results.

Sulfur Black 1 is known to have sulfur containing substituents in proximate positions. Straightforward analysis of the insoluble SB 1 reveals a sulfur-to-sulfur bond. This would accordingly be a linked structure with each sulfur atom having one connection to the main molecule of the dye (i.e., $R_{dye}$—S—S—$R_{dye}$). The R may be the same or a different dye molecule. Where the R is the same dye molecule, the structure is a closed or ring configuration. Both the ring and the non-ring structure, when formed, would be generally stable and non-polar, thereby not favoring solubility with water.

The ordinary soluble SB 1 would have its substituents in the form of thiosulfonates (i.e., R—S—$SO_3^-$). In water, the thiosulfonate hydrolyzes with time and temperature according to the following equation $RSSO_3^- + H_2O \rightarrow RS^- + SO_4^{-2} + 2H^+$. Both the thiosulfonate and sulfide (the radical composed of a single sulfur), as substituents are polar and thereby favor solubility with water. So long as this form remains, the polar sulfides are subject to mild oxidation resulting in linkage with proximal sulfides to produce the irreversible, insoluble form discussed in the prior paragraph (i.e., $2RS^- \rightarrow R_{dye}$—S—S—$R_{dye}$).

Oxidation of soluble SB 1 converts the sulfide substituents to sulfonate radicals (i.e., R—$S^-$ is converted to R—$SO_3^-$). This form is stable and polar, thereby favoring solubility with water and not tending to subsequently change to an insoluble form.

Accordingly, when insufficient hydrogen peroxide is used, the dye reaches the sulfide form, but not the sulfonate form. Subsequent treatment of the sulfide form in acid links proximate sulfides to irreversibly produce an insoluble molecule. Sufficient hydrogen peroxide converts the sulfide form to the sulfonate, to irreversibly produce a soluble molecule. Addition of excess peroxide or running the reaction above pH 6 may cause oxidation of the dye itself with alteration of its absorption characteristics.

Characteristics in Jet Ink

An ink generally as described for Example 3, with the Sulfur Black being added after being completely oxidized as in Example 2 showed characteristics as follows. This was compared with an otherwise identical ink having commercial Sulfur Black 1.

Water fastness—This is a measure of the amount of ink removed from a printed page by soaking in water for a specified period. After the soaking the contrast of marked to unmarked areas of printing is observed.

The two inks were applied to notebook paper and allowed to dry. After soaking the samples for 24 hours, print contrast signals were identical. Accordingly, the modified Sulfur Black 1 has no effect on water-fastness.

Lightfastness—This is a measure of the degradation of light absorbance from ink on a printed page when subjected to strong illumination for a specified period. Immediately after printing and after the period of illumination, the contrast of marked to unmarked area of printing is observed.

Immediately after printing the standard ink showed a contrast signal of 0.80 while the modified ink showed a contrast signal of 0.82. The two samples were then subjected to carbon arc illumination for 72 hours, after which the standard showed a contrast signal of 0.74, while the modified in showed a contrast of 0.76.

Accordingly, the modified Sulfur Black 1 has virtually no effect on lightfastness, although possibly it slightly lowered the print contrast.

Start-Up—This is a measure of clogging at the nozzle during periods of non-printing. In using the modified ink, no start-up failures or nozzle deposits were noted over a two month period involving 34 trials at roughly regular intervals. Comparable tests with the standard ink demonstrated deposits in the nozzle at one month intervals.

Particle Minimization—Upon heating the standard ink and the modified ink for the two weeks at 60° C. particle counts at both were very low. After such heating for four weeks, however, the particle count per milliliter of the modified ink was 28,000, while the particle count of the standard was at least 120,000 and too large to actually determine. This clearly demonstrates that the modified Sulfur Black 1 has an irreversible solubility not found in ordinary Sulfur Black 1.

It will be apparent that the gist of this invention is in the use of a modified Sulfur Black 1 and that formulations and application may vary while still being within the scope and contribution of this invention and that, therefore, patent coverage should not be limited to the embodiments disclosed, but should be as provided by law, with particular reference to the accompanying claims.

What is claimed is:

1. Water soluble Sulfur Black 1 substantially completely oxidized at the solubilizing groups, substantially free of other Sulfur Black 1, and suitable for incorporation in an aqueous printing ink to provide an imaging capability to said aqueous printing ink.

2. An aqueous jet ink having dye consisting essentially of at least one dye of said completely oxidized Sulfur Black 1 as described in claim 1.

3. An aqueous jet ink as in claim 2 in which said Sulfur Black 1 is in the order of magnitude of 1% by weight of said ink.

4. The process of modifying Sulfur Black 1 for use as a water soluble dye in aqueous inks comprising completely oxidizing said Sulfur Black 1 at the solubilizing groups.

5. The process as in claim 4 in which said Sulfur Black 1 is oxidized in an aqueous solution containing hydrogen peroxide in an amount at least about three-fifths by weight the weight of said Sulfur Black 1 and said solution is predominately acidic.

6. The process as in claim 4 in which said solution comprises about equal amounts by weight of said Sulfur Black and said hydrogen peroxide.

7. The process of modifying an aqueous ink containing Sulfur Black 1 to reduce particle formation comprising treating said ink with an oxidizing agent until said Sulfur Black is substantially completely oxidized at the solubilizing groups.

8. The process as in claim 7 in which said oxidizing agent is hydrogen peroxide.

* * * * *